United States Patent Office 3,330,801
Patented July 11, 1967

3,330,801
MACROMOLECULAR FORMALDEHYDE POLYMERS STABILIZED BY NON-CONJUGATED AMIDES
Johannes J. M. Evers, Sittard, and Jan W. H. Zijp, Geleen, Netherlands, assignors to Stamicarbon N.V., Heerlen, Netherlands
No Drawing. Filed Apr. 5, 1963, Ser. No. 270,824
Claims priority, application Netherlands, Apr. 10, 1962, 277,050
8 Claims. (Cl. 260—45.9)

The present invention relates to a process for improving the processibility of macromolecular formaldehyde polymers, particularly of homopolymers and copolymers prepared by polymerization of gaseous formaldehyde or trioxane, in the presence or absence of an inert, liquid dispersing agent and/or polymerization initiators. Suited comonomers are for example styrene, halogenated or unhalogenated acetaldehyde, cyclic esters such as epsilon-caprolactone, or cyclic ethers such as glycidyl esters, ethylene oxide or dioxolan.

The addition of synthetic polyamides as stabilizers for improving the resistance of formaldehyde polymers against thermic degradation is disclosed in British Patent 860,410. Additionally, it is known from Belgian Patent 584,257 that amides of polybasic carboxylic acids can be used as stabilizers for the above-mentioned purpose although, according to this patent, the amides of monobasic carboxylic acids have only a very slight stabilizing effect on polyformaldehyde.

French Patent 1,253,553 also discloses the possibility of using inter alia, certain aliphatic, aromatic, cycloaliphatic, or heterocyclic compounds containing one or more primary, secondary, or tertiary amide groups for stabilizing macromolecular formaldehyde polymers. Some substances mentioned in this French patent as suitable compounds of this type are, for example, the amides of N-phenyl-acrylic acid, N,N'-methallyl-bisacrylic acid, N-methylol-acrylic acid, and N,N-diethyl-methacrylic acid.

The principal object of the present invention is to provide certain novel and advantageous improvements over the above-mentioned prior efforts to stabilize macromolecular formaldehyde polymers. Other objects will also be apparent from the following detailed description of the invention.

According to the present invention, it has now been found that the processibility of macromolecular formaldehyde polymers can be considerably improved by adding to the polymer, before or during processing, one or more primary, secondary, or tertiary amides of an olefinic unsaturated monocarboxylic acid in which the C=C bond is not conjugated with the C=O bond. The unique stabilizing effect of these amides is shown by the fact that formaldehyde polymers which, in the absence of such amides, decompose to a considerable extent at a processing temperature of 185 to 195° C., as evidenced by the smell of formaldehyde, a decrease of the viscosity and an increase of the melt index, can be readily processed without these problems if one or more of the above-mentioned amides is added to the polymer. This addition also has a favorable effect on the mechanical properties of the products made from such polymers.

Broadly stated, therefore, the present invention relates to a process for improving the processibility of macromolecular formaldehyde polymers by the addition of one or more amides thereto, before or during processing, the amides being selected from the group consisting of primary, secondary, and tertiary amides of olefinic unsaturated monocarboxylic acids in which the C=C bond is not conjugated with the C=O bond.

Examples of amides which can be used in the process according to the invention are: the amides of oleic acid, erucic acid, linoleic acid, linolenic acid, mixtures of the amides of oleic acid and palmitic acid and/or stearic acid, N-palmitic-oleic acid amide, N-stearyl-oleic acid amide, N,N-diethyloleic acid amide, N,N'-methylene-bis-oleic acid amide, and N,N'-methylene-bis-erucic acid amide or, for example, the amide of vinyl acetic acid. Preferably, use is made of amides of the said carboxylic acids that contain at least six carbon atoms.

The amides may be added to the formaldehyde polymer in practically any amount desired, but to achieve a distinctly perceptible effect it is necessary in most cases to add an amount of amide of not less than 0.01% by weight, based on the weight of formaldehyde polymer. The amide is preferably added in an amount varying between 0.1 and 10% by weight, based on the weight of formaldehyde polymer.

The amide may be added to the formaldehyde polymer in any known way. It may, for instance, be added before or during the polymerisation. The amide may also be intimately mixed in the dry state with likewise dry formaldehyde polymer, in a mixing device. It may also be suspended, or dissolved, in a suitable dispersing agent in which the formaldehyde polymer is also suspended, after which the resulting mixture is evaporated to dryness. The amide may also be added to the formaldehyde polymer on a heated, or non-heated, roller mixer, or during processing of the polymer, for instance in an extruder. As stated earlier it is also possible to use a mixture which contains the amides considered, such as natural or synthetic waxes.

Other substances, such as stabilizers against oxidation or discoloration, fillers, pigments and the like, may also be added to the macromolecular formaldehyde polymers either before or after or with the amide addition according to the invention. As a rule, the macromolecular formaldehyde polymers treated herein will have molecular weights in the area of about 10,000 to 100,000 although it will be appreciated that molecular weights outside this range may be used. The polymers may be homopolymers or copolymers as such or modified in known fashion so that acetylation or formation of ether takes place.

The invention is illustrated but not limited by the following example:

The influence of the addition of amides according to the invention on the processibility of macromolecular formaldehyde polymers is demonstrated using two formaldehyde polymers with an inherent viscosity (measured at 60° C. on a solution of 0.5 g. of polymer in 100 ml. of p-chlorophenol, containing 2% of α-pinene) of 2.25 and 1.95, respectively, and with a degree of decomposition after the first 10 minutes of heating at 220° C., equal to 3.1 and 4.9%, by weight, respectively. The latter quantity was determined by introducing about 0.05 g. of polymer into a furnace which is heated at 220° C. and through which nitrogen is passed at the rate of 1.5 l./h., leading the escaping gases over cupric oxide heated at 700° C. with the result that the formaldehyde is oxidized to carbon dioxide, and finally collecting this gas in pyridine and continuously titrating it with sodium methanolate.

If these polymers are fed to a roller mixer heated at 185 to 190° C., a considerable evolution of formaldehyde is observed within 5 minutes, and the highly viscous mass soon becomes thinly liquid and flows off the roller. The resultant product is a brittle mass of a stringy structure, which cannot be further processed into, for example, injection-moulding grains or sheets. The melt index of these products (determined by the "A.S.T.M.-test method D 1238/57 T" at 190° C.) is 15.0.

If 0.1% by weight of the anti-oxidant 4,4'-butylidene-bis(3 - methyl - 6 tertiary butylphenol) is added to the polymers before they are fed to the roller mixer, no difference is noted in the behaviour of the polymer on the mixer as compared with that where the anti-oxidant has not been used.

Besides the above-mentioned anti-oxidant, three examples of amides according to the invention were subsequently added to samples of these polymers in amounts of 1% by weight, based on the weight of the polymer. When these mixtures are fed to a roller mixer heater at 185 to 190° C., no formaldehyde evolution is observed, the viscous mass adheres well to the roller and no stringy structure is formed. Of the rolled sheets thus obtained plaques have then been pressed on which a number of mechanical properties of the polymers have been measured. These measurements include, in addition to the melt index mentioned above, the tensile strength and the percentage elongation (in accordance with A.S.T.M.-test method D 638/58 T the test rod dimensions being chosen in accordance with A.S.T.M.-test method D 412, type C test rod, and at a tensile velocity of 3 cm. per minute at 20° C.), the modulus of elasticity (in accordance with A.S.T.M.-test method D 638/58 T at 20° C.), and the energy value in the tensile-impact test (determined in accordance with H. H. Racke's method. Material prüfung 3, 89 (1961), at a tensile velocity of 3 m. per second at 20° C.). The results obtained in these measurements are shown in the following table:

What is claimed is:
1. Polymer compositions of improved processability, said compositions comprising macromolecular formaldehyde polymer and at least one amide selected from the group consisting of erucic acid amide and the primary amide of oleic acid.
2. The composition of claim 1, wherein the amide is the primary amide of oleic acid.
3. The composition of claim 1, wherein a mixture of amides is used, wherein the mixture comprises the primary amides of oleic acid and stearic acid.
4. The composition of claim 1, wherein the amide is erucic acid amide.
5. A shaped article made from the polymer composition of claim 1.
6. A polymer composition of improved processability consisting essentially of a macromolecular formaldehyde polymer and at least one amide stabilizer selected from the group consisting of erucic acid amide and the primary amide of oleic acid, said amide stabilizer being present in an amount of about 0.01 to 10% by weight of the formaldehyde polymer.
7. The composition of claim 6 wherein said amide stabilizer is erucic acid amide.
8. The composition of claim 6 wherein said amide stabilizer includes the primary amide of oleic acid.

|  | Inherent viscosity of starting product | | | |
|---|---|---|---|---|
|  | 2.25 | | | 1.95 |
|  | Amide added | | | |
|  | None | Oleic acid amide | Oleic acid amide/stearic acid amide | Erucic acid amide |
| Melt index in g./10 min | 15.0 | 10.9 | 9.1 | 7.1 |
| Tensile strength in kg./cm.² | (¹) | 685±30 | 690±40 | 680±25 |
| Percentage elongation | (¹) | 11±4 | 7.5±1.7 | 9.5±3.5 |
| Modulus of elasticity in kg./cm.² | (¹) | 26,000±800 | 25,900±700 | 26,500±700 |
| Energy in tensile-impact test in kg./cm.² | (¹) | 50±30 | 75±35 | 68±19 |
| Inherent viscosity | (¹) | | | 1.89 |

¹ Determination of these properties was not possible owing to the decomposition occurring during rolling.

The acid amides used in the above example are all primary amides. However, the invention is also applicable with the secondary and tertiary amides of the indicated unsaturated monocarboxylic acids.

It will be appreciated that various modifications may be made in the invention described herein without deviating from the scope thereof as set forth in the following claims wherein:

References Cited

FOREIGN PATENTS 1,253,553    1/1961    France.

DONALD E. CZAJA, *Primary Examiner.*

LEON J. BERCOVITZ, *Examiner.*

M. J. WELSH, *Assistant Examiner.*